United States Patent Office 3,719,505
Patented Mar. 6, 1973

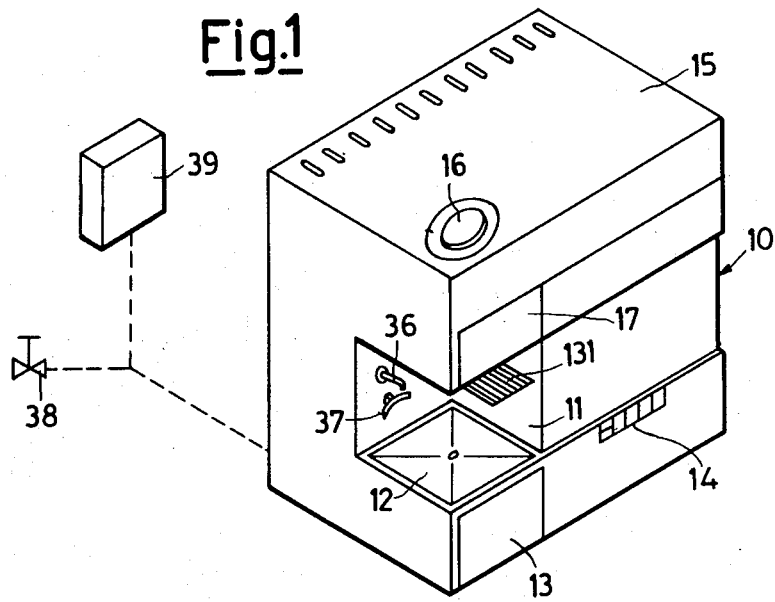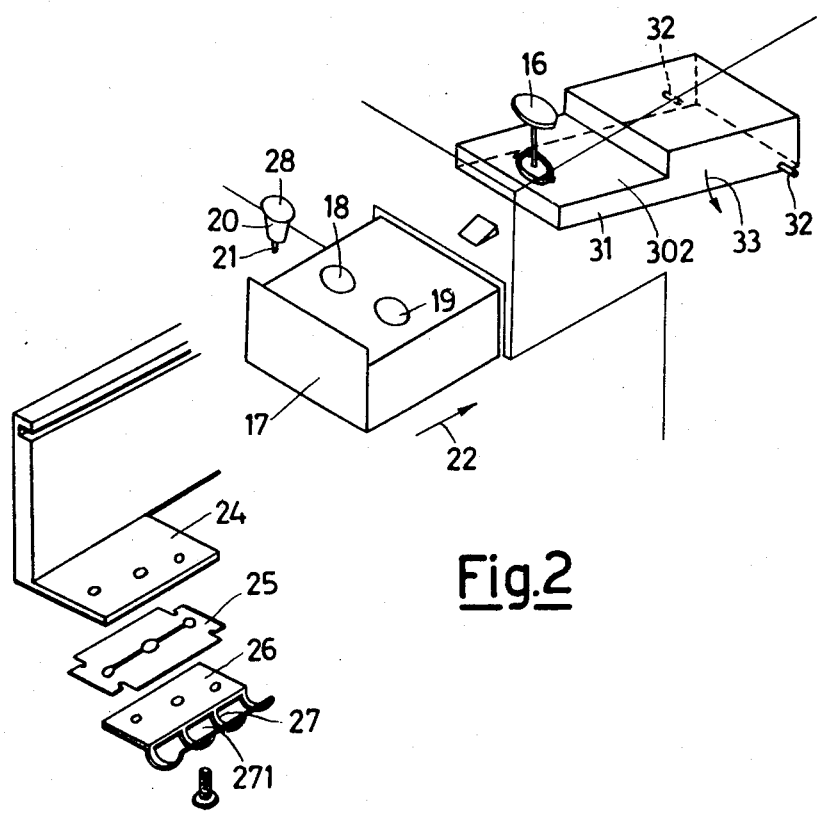

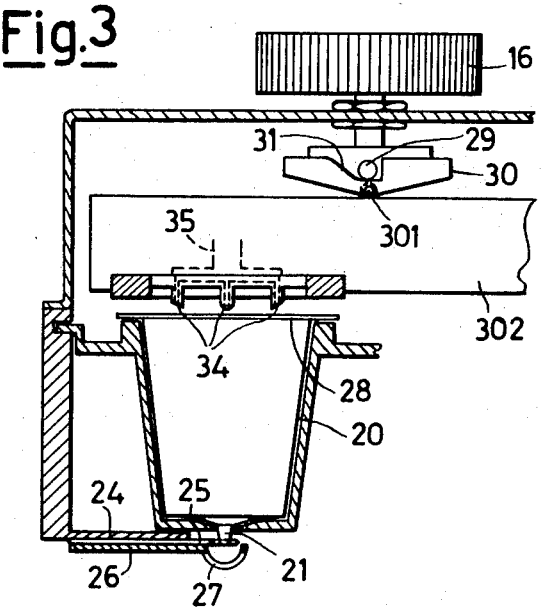
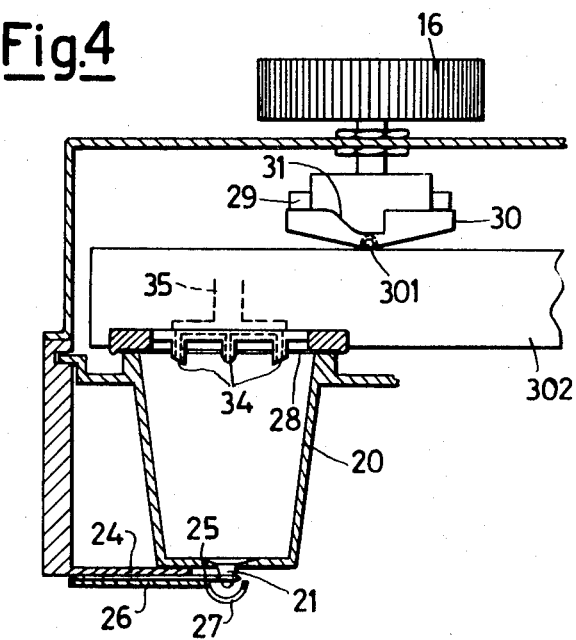

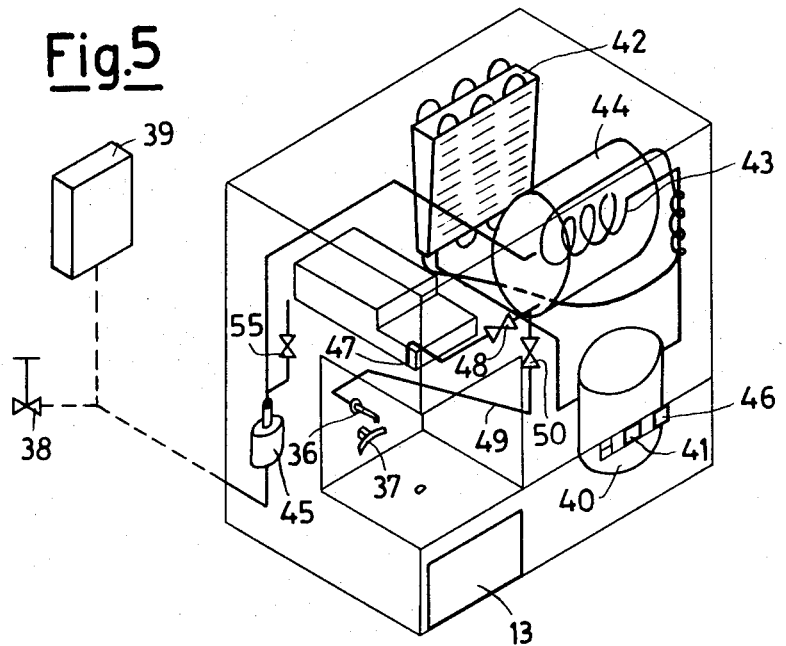
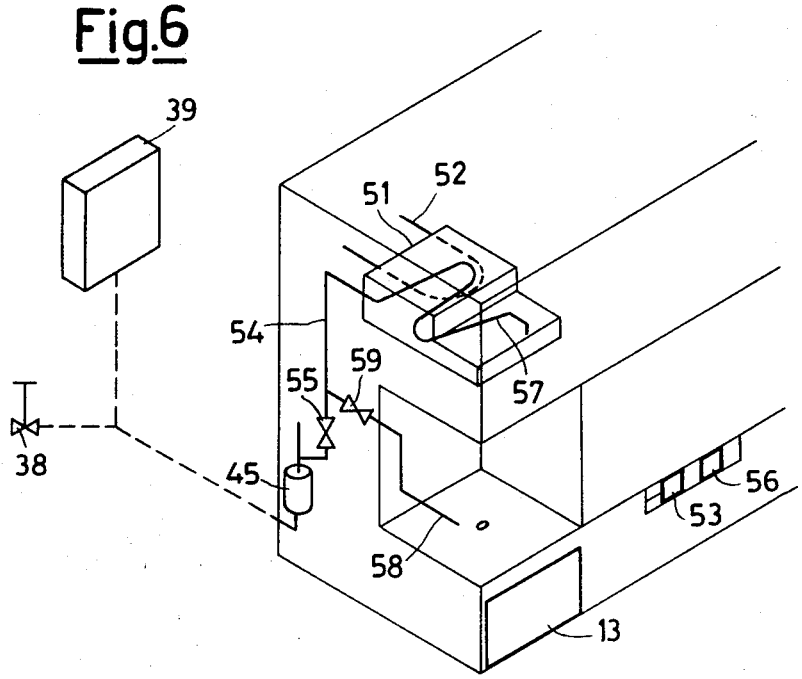

3,719,505
HOUSEHOLD ELECTRIC MACHINE FOR BREWING
AND DISPENSING BEVERAGES
Lamberto Mazza, Pordenone, Italy, assignor to Kantor
International S.A., Luxemburg, Luxemburg
Filed June 1, 1971, Ser. No. 148,811
Claims priority, application Italy, June 4, 1970,
25,527/70
Int. Cl. A23l *1/00*
U.S. Cl. 99—275
8 Claims

ABSTRACT OF THE DISCLOSURE

A household machine for the instant preparation of hot or cold drinks is disclosed, of the kind in which a sealed cartridge containing a soluble ingredient is punctured and then fed with a liquid. The machine is characterized in that the cartridges are placed in a drawer-like cartridge holder, with distinct recesses for the cartridges intended for brewing hot drinks and cold drinks respectively. Selection switching means are provided for selecting between cold-liquid feed and hot-liquid feed. Cartridge-puncturing means in the form of nozzles are provided and a cam disc effects the selection of the liquids.

---

This invention relates to a household electric machine in which rupturable cartridges are used, which contain substances either in powder or concentrated liquid form, for brewing and dispensing both hot and cold beverages.

It is known that, in recent years, cartridges have been provided which have a very reduced bulk and which contain freeze dried powders or syrups adapted for the preparation of both hot and cold beverages by admixture with a metered amount of a liquid such as water, milk and others.

This invention aims to exploiting the versatility and convenience of cartridges of the kind referred to above for providing, for household use, a complete machine for the preparation of both cold and hot beverages, characterized in that it comprises a receptacle for receiving at least one cartridge containing an ingredient, either in solid or concentrated liquid form, for the preparation of a unit dosage of a beverage, means for rupturing the bottom of the cartridge located in said receptacle, means for establishing a communication between the top of the cartridge and a source of a liquid which has been conditioned for the preparation of the beverage concerned, a refrigeration circuitry adapted to feed, via appropriate valve means, said source of conditioned liquid, a heating circuitry adapted to feed, via appropriate valve means, said source of conditioned liquid as an alternative with respect to said refrigerating circuitry, control and selection means for the source of the conditioned liquid to switch it from and to said heating circuitry or said refrigerating circuitry, and a common feed for the liquid to be conditioned (that is, to be either heated or cooled) respectively, to said heating circuitry and to said refrigerating circuitry.

By so doing, as will become apparent also as the present disclosure proceeds, a substantial advantage is attained, from the household point of view, of dispensing with the storage of bottles and containers of prepared beverages, as regards drinks and the like, and a single machine is entrusted with the preparation of all the beverages which are required, it being only required to keep in storage an appropriate amount of cartridges of the several desired types. Another advantage is the instant preparation of the beverages in the desired dosage, thus doing away with the risks of contamination, ageing and deterioration.

An additional advantage is the versatility of use, which is an intrinsic feature of the machine according to the present invention.

The household appliance will be now described in detail with reference to the accompanying drawings, wherein:

FIG. 1 is a perspective view, from outside, of the machine according to the invention.

FIG. 2 is an exploded view of the drawer-like receptacle for the cartridges and the attendant meants for placing a cartridge in readiness for brewing a beverage dosage unit.

FIGS. 3 and 4 are detailed views, on an enlarged scale, of the means for feeding a cartridge with conditioned liquid.

FIG. 5 is a diagrammatical view of the refrigerating circuitry of the machine, and FIG. 6 is a diagrammatical showing, similar to that of FIG. 5 of the heating circuit of the machine.

Having reference, at the outset, to the FIGS. from 1 to 4, the household appliance according to the present invention comprises a cabinet 10 in which a chamber 11 is formed, to place therein a glass or other container to receive the prepared drink dosage. The base 12 of the chamber 11 is appropriately foraminous so that all the liquid which is possibly spilled by overflowing from the glass or drips from the dispensing nozzles is collected in an underlying removable tray 13.

In the chamber 11, above the base 12, there is removably arranged a supporting rack 131 adapted to hold small cups such as more particularly coffee cups.

A pushbutton panel 14 is provided, moreover, on the cabinet 10 to control the several functions of the machine, as will be explained in detail hereinafter.

On the lid 15 of the machine, furthermore, a knob 16 is provided for puncturing the cartridges 20. These are loaded in a removable drawer-like member 17 which carries on its top surface two recesses 18 and 19, which are intended, the first, 18, for cartridges adapted to the preparation of cold beverages, the second, 19, for the preparation of hot drinks, respectively. The recesses of hollows 18 and 19 are so shaped as snugly to hold a cartridge 20 so that the cartridge bottom, which carries a depending nipple 21 to be cut out, may project below the bottom wall of the recess 18 (or 19) in which its has been located. As the drawer 17 is loaded with one or two cartridges and restored to its position in the direction indicated by the arrow 22 (FIG. 2), the depending nipple of each cartridge is cut out by a cutting device mounted in a fixed location (of the kind shown in FIG. 2), comprising a supporting ledge 24 affixed to the side of the cabinet 10 of the machine and projecting towards the interior thereof.

To the ledge 24 is affixed, by a screw, a cutting blade (such as, for example, the blade 25) which is supported from beneath by the shaped plate 26, the latter providing a channel 27 whose size is so selected as to provide a sliding passage for the depending nipple 21 and a shield against possible accidental cuts for the operator. During such a sliding stroke, the nipple 21 is cut out and disposed of through openings 271 as formed through the bottom wall of the channel 27. To puncture the upper lid 28 of the cartridge, the abovementioned knob 16 is employed, which has a pin 29 (FIGS. 3 and 4) cooperating with a cam disc 30 equipped with a cavity 31 in which the pin 29 is seated. The disc 30 is swingably pivoted on an axle 301, relatively to a presser plate 302, the latter being pivoted by pins 32 to the machine cabinet (FIG. 2) and being rotatable in the direction of the arrow 33. Through the underface of the presser plate 302 two sets of projecting and pointed nozzles 34 are provided, which, as the presser plate is rotated downwards by the agency of the cam disc 30 (as a result of the rotation of the knob 16 and consequential downward thrust imparted by the pin 29 on the surface of the cavity 31), puncture the lid 28 of the cartridge 20 placed in the corresponding recess 18 (or 19) and establish a communication between the interior of the cartridge and a feeding manifold 35. In the cavity 31 a continuous discharge cock 36 (FIG. 1) is also provided, as controlled by a pushbutton 37.

It will be observed, in addition, that, if the drinks are brewed with water, the connection of the household appliance can be made either to a conventional tap 38 of the water main, or to a self-contained tank 39. With said second approach, a further advantage of the machine becomes apparent, that is, its versatility, in the sense that the machine can be adapted both to a fixed installation (connection to the water main) and to a transportable installation (by exploiting the self-contained reservoir).

It is obvious that both the connections can be coextensive if appropriate valve means are provided. It should also be emphasized, at last, that the particular shape of the presser plate 302 and the existence of a conventional gasket of a resilient material, ensure, once the lid 28 of a cartridge has been punctured, a perfectly tight seal around the edges of the cartridge.

Considering now in more detail FIG. 5, there is shown the cooling circuitry for dispensing cold water, which comprises a compressor 40, actuated by the pushbutton 41, a condenser 42 and an evaporator 43, immersed in the container 44 which holds the water to be cooled, the latter being fed by a circulation pump 45, whose energization is controlled by the pushbutton 46.

The outlet of cold water from the container 44 reaches the discharge 47 through a cutoff electromagnetic valve 48 (controlled by the pushbutton 46 again) and then the manifold 35 which corresponds to the recess 18 intended to receive the cartridges for brewing cooled beverages.

The outlet of the container 44 is also connected, through the duct 49 and the electromagnetic valve 50, to the continuous dispensing nozzle 36. In such a case the above mentioned pushbutton 37 controls the actuation of both the pump 45 and the electromagnetic valve 50.

Coming now to FIG. 6, there is shown the heating circuitry for dispensing hot water, comprising a thermostatically controlled water-heater 51, electrically heated by a resistor 52 and controlled by the switch 53.

The water-heater 51 is fed by the pump 45 through a duct 54 which has an electromagnetic valve 55, whereas a pushbutton 56 controls the energization of both the pump 45 and the magnetic valve 55. The outlet of hot water from the water-heater 51, through the duct 57, comes to the manifold 35 which corresponds to the recess 19 intended to receive cartridges for brewing hot beverages.

The duct 54 branches off into a second duct 58 which has a magnetic valve 59 whose operation is in a direction contrary to that of the electromagnetic valve 55 in order to discharge the pressure which is necessary for dispensing, into the drawer 13.

The electromagnetic valve 59 is energized by actuating the push-button 53 thus permitting the possible discharge of the water held in the water heater 52, and is de-energized by the push-button 56 as the latter is actuated to control dispensing through the pump 45. Of course, the push-button 56 will be actuated only as the water heater has reached the required working conditions. It will be observed that in the description of the drawings, reference has been principally had to the preparation of water-based drinks, but this is in no wise intended as a limitation as to the nature of the liquid used for brewing the drinks.

Be it understood, in addition, that any modification or change which is mechanically and ideally equivalent is considered as being encompassed in and by the scope of the present invention.

The embodiments of the invention in which an exclusive property or privilege is claimed are defined as follows:

1. An electric household machine for brewing and dispensing hot and/or cold beverages, characterized in that it comprises a receptacle for receiving at least one cartridge containing an ingredient in either a solid or a concentrated liquid form for brewing a unit dose of a beverage, means for opening the bottom wall of the cartridge as located in said receptacle, means for establishing a communication between the cartridge top and a source of a liquid conditioned for the preparation of the drink, a refrigerating circuitry for feeding through appropriate valve means said source of conditioned liquid, a heating circuitry adapted to feed through appropriate valve means said source of conditioned liquid in alternation with respect to said refrigeration circuitry, means for controlling and selecting the feed of conditioned liquid to and from said heating circuitry or said refrigerating circuitry, respectively and a common feed of liquid to be conditioned, to said refrigerating circuitry and to said heating circuitry, respectively.

2. A machine according to claim 1, characterized in that said receptacle comprises two recesses or cavities having their bottom wall apertured, one of which is intended to receive cartridges adapted for the preparation of hot drinks and the other cartridge for the preparation of cold drinks, said recesses being so shaped that the lid of the cartridge is flush with the upper edge and the depending nipple, with which the cartridge is equipped, projects beneath the bottom wall of said recess.

3. A machine according to claim 2, characterized in that said means for opening the bottom of the cartridge comprise blade means adapted to cut said nipple of the cartridge, the recesses being carried by a drawer which can be withdrawn from the machine cabinet for loading the cartridges, said blade means being located in such a position as to cut out the depending nipples of the cartridges placed in the recesses while the drawer which carries the recesses is slid in position into the machine again.

4. A machine according to claim 2, characterized in that said means for establishing a communication between the cartridge top and a source of conditioned liquid comprise a set of nozzles projecting below a presser plate which is movable between a first position where the recess-carrying drawer is free to slide for being withdrawn, and a second position where said nozzles penetrate the cartridge lid by puncturing the same, said presser plate being brought to said second position by a cam disc engaged by an actuating lever placed outside the machine cabinet, said presser plate carrying in addition two sets of nozzles corresponding to the number of the recesses, each set of nozzles being in communication with a common manifold connected to the refrigerating circuitry, or to the heating circuitry, respectively.

5. A machine according to claim 4, characterized in that said refrigerating circuitry comprises a compressor, a condenser and an evaporator, said evaporator being in heat exchanging relationship with a container fed with the liquid to be cooled and the outlet of said container being connected, through valve means, to the common manifold of a set of nozzles in said presser plate for feeding with cooled liquid the cartridge intended for the preparation of cold drinks, the feed of the liquid to be cooled being effected by a pump located upstream of said container.

6. A machine according to claim 5, characterized in that said outlet from said container also communicates, through appropriate valve means, with a distinct nozzle for the continuous dispensing of cooled liquid.

7. A machine according to claim 4, characterized in that said heating circuitry comprises a water-heater, in which liquid fed by the same pump which feeds the refrigerating circuitry is caused to flow, electric resistor means for heating the liquid in said heater, the outlet of said heater being in communication with the manifold of the set of nozzles of said presser plate intended to feed with a heated liquid the cartridge to be used for the preparation of hot drinks.

8. A machine according to claim 1, characterized in that said liquid is water, which is either supplied by the conventional water main, or by a discrete reservoir.

References Cited
UNITED STATES PATENTS

| | | | |
|---|---|---|---|
| 2,657,628 | 11/1953 | Stoeser | 99—275 |
| 2,927,522 | 3/1960 | Rockwood | 99—290 |
| 3,260,190 | 7/1966 | Levinson | 99—295 |
| 3,634,107 | 1/1972 | Cornelius | 99—275 |

ROBERT W. JENKINS, Primary Examiner

U.S. Cl. X.R.

99—295